UNITED STATES PATENT OFFICE.

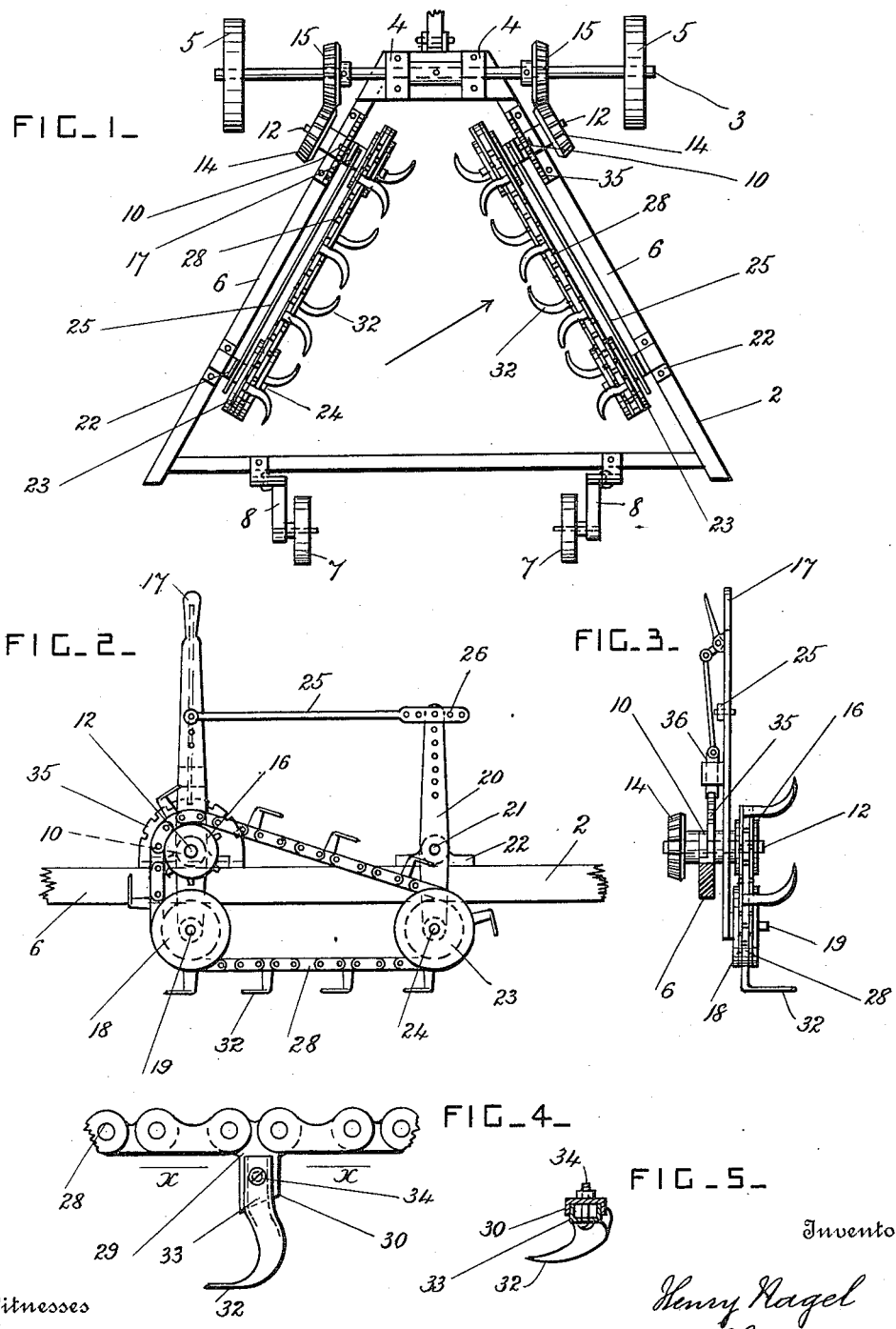

HENRY NAGEL, OF RITZVILLE, WASHINGTON.

CULTIVATOR.

1,080,993.  Specification of Letters Patent.  Patented Dec. 9, 1913.

Application filed August 12, 1913. Serial No. 784,344.

*To all whom it may concern:*

Be it known that I, HENRY NAGEL, a citizen of the United States, residing at Ritzville, in the county of Adams and State of Washington, have invented certain new and useful Improvements in Cultivators; and I do hereby declare the following to be a full, clear, and exact description of the invention, such as will enable others skilled in the art to which it appertains to make and use the same.

This invention relates to cultivators provided with positively driven knives or teeth which cut the weeds and harrow the soil; and it consists in the novel construction and combination of the parts hereinafter fully described and claimed.

In the drawings, Figure 1 is a plan view of a cultivator constructed according to this invention. Fig. 2 is a side view of one side portion of the cultivator, looking in the direction of the arrow in Fig. 1. Fig. 3 is an end view of the side portion of the cultivator shown in Fig. 2. Fig. 4 is a detail view of a portion of a drive chain and a knife. Fig. 5 is a cross-section, taken on the line *x—x* in Fig. 4.

A supporting frame 2 is provided which is substantially triangular in form. A driving shaft 3 is journaled in bearings 4 at the front end portion of the frame, and is provided with ground wheels 5. One of the ground wheels is arranged to revolve the driving shaft 3 as the machine is drawn along, and this ground wheel is operatively connected with the shaft 3 in any approved manner.

The supporting frame has rearwardly and outwardly inclined side bars 6, and its front end is provided with a draft attachment of any approved construction. The rear end portion of the frame is provided with ground wheels 7 which are carried by arms 8 which are adjustable, so that the height of the rear end of the frame above the ground can be varied at will.

The cutting and harrowing devices are similar at each side of the frame, and the description will therefore be confined to one of them.

A bearing 10 is secured to the front end portion of each side bar 6, and a shaft 12 is journaled in the bearing 10. A beveled toothed wheel 14 is secured on one end portion of the shaft 12 and gears into a beveled toothed wheel 15 secured on the driving shaft 3. A sprocket wheel 16 is secured on the other end portion of the shaft 12. A hand-lever 17 is pivoted concentric with the shaft 12, and a guide sheave 18 is journaled on a pin 19 at the lower end portion of the hand-lever below the sprocket wheel 16. A lever 20 is journaled on a pin 21 projecting from a bracket 22, which is secured to the rear end portion of the side bar 6, and a guide sheave 23 is journaled on a pin 24 at the lower end portion of the lever 20.

A connecting-rod 25 is pivoted between the upper portions of the levers 17 and 20, and is provided with a plurality of pivot pin holes 26 so that the distance between the two guide sheaves can be adjusted to the drive chain.

The drive chain 28 is formed of side links arranged in pairs and pivoted to center links 29. The center links 29 have channel-shaped sockets 30 which project vertically from them. Sickle-shaped and curved knives or teeth 32 are provided, and have channel-shaped shanks 33 which engage with the sockets 30. Bolts 34 pass through holes in the shanks and sockets, and secure the knives to the drive chain with their points projecting forwardly and inwardly toward the center line of draft of the cultivator.

A toothed quadrant or segment 35 is secured to the side bar, and the hand lever 17 is provided with a catch 36 for engaging with the teeth of the quadrant. The hand-lever is moved pivotally to vary the distance between the points of the knives or teeth and the side bar, so as to vary the depths of the cuts in the ground.

As the machine is drawn along the endless drive chains are operated by the sprocket wheels and driving mechanism so that the knives are moved forwardly in the frame. The laterally curved blades cut off all the weeds, and the points of the blades or teeth harrow the ground. As the drive chains are inclined to the center line of draft, the whole surface of the ground is harrowed and all the weeds are cut, and the ground is not merely harrowed in longitudinal parallel lines having unharrowed spaces between them. The blades are formed from sheet metal, the channel-shaped shanks being made by bending portions of the sheet metal parallel to each other. These channel-shaped shanks and sockets form a strong connection between the knives and the chains, which is necessary and desirable on account of the twisting strains to which the knife shanks are subjected, due to the lateral curvature of the blades.

What I claim is:

1. In a cultivator, the combination, with a wheeled frame, of a pair of diverging drive chains supported from the said frame, driving mechanism for operating the drive chains, and curved blades carried by the drive chains and projecting laterally toward the center line of draft at the lower stretches of the drive chains.

2. In a cultivator, the combination, with a wheeled frame, of a pair of diverging drive chains supported from the said frame, driving mechanism for operating the drive chains, and curved sickle-shaped blades carried by the drive chains and projecting laterally toward the center line of draft at the lower stretches of the drive chains with their points toward the front end of the machine.

3. In a cultivator, the combination, with a frame, a driving shaft journaled at the front part of the frame and provided with ground wheels, and ground wheels which support the rear part of the frame; of a pair of diverging drive chains supported from the said frame, beveled toothed wheels arranged in pairs and operating the respective drive chains from the driving shaft, and curved blades carried by the drive chains and projecting laterally toward the center line of draft at the lower stretches of the drive chains.

4. In a cultivator, the combination, with a supporting frame, of a rearwardly and outwardly inclined drive chain, a sprocket wheel journaled in the frame and engaging with the drive chain, two levers pivoted to the frame, one lever being pivoted concentric with the sprocket wheel, guide sheaves for the drive chain carried by the said levers and arranged below the sprocket wheel, a connecting-rod between the said levers, means for locking the levers to the frame, curved blades carried by the drive chain and projecting laterally of the line of draft, and driving mechanism for revolving the sprocket wheel.

5. In a cultivator, the combination, with a drive chain provided with center links having vertically-projecting channel-shaped sockets, of means for supporting and driving the drive chain, and curved blades formed of sheet metal and having channel-shaped shanks which are secured in the said sockets, said blades being curved to project laterally of the line of draft of the machine.

In testimony whereof I have affixed my signature in the presence of two witnesses.

HENRY NAGEL.

Witnesses:
J. OSCAR ADAMS,
OTTO W. NAEF.

---

Copies of this patent may be obtained for five cents each, by addressing the "Commissioner of Patents, Washington, D. C."